Dec. 16, 1924. 1,519,287
J. C. WOODSON
ELECTRIC HEATING SYSTEM FOR CONVEYER OVENS
Filed June 5, 1922 2 Sheets-Sheet 1
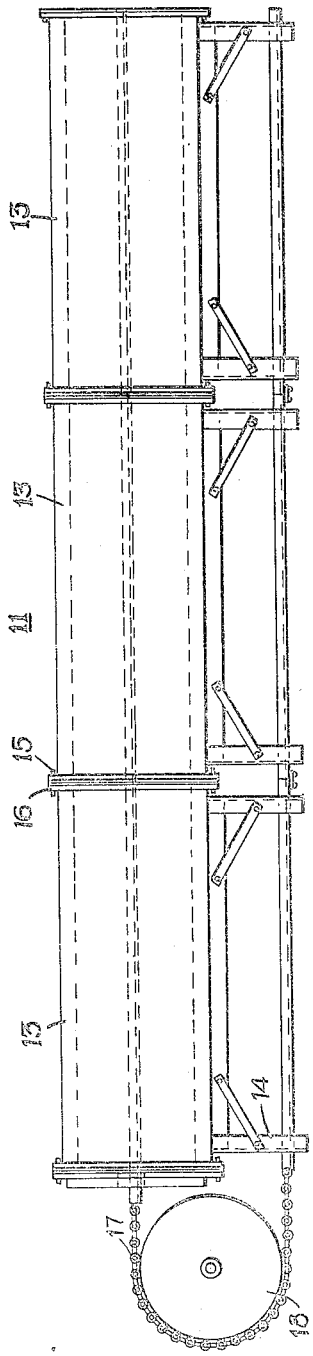
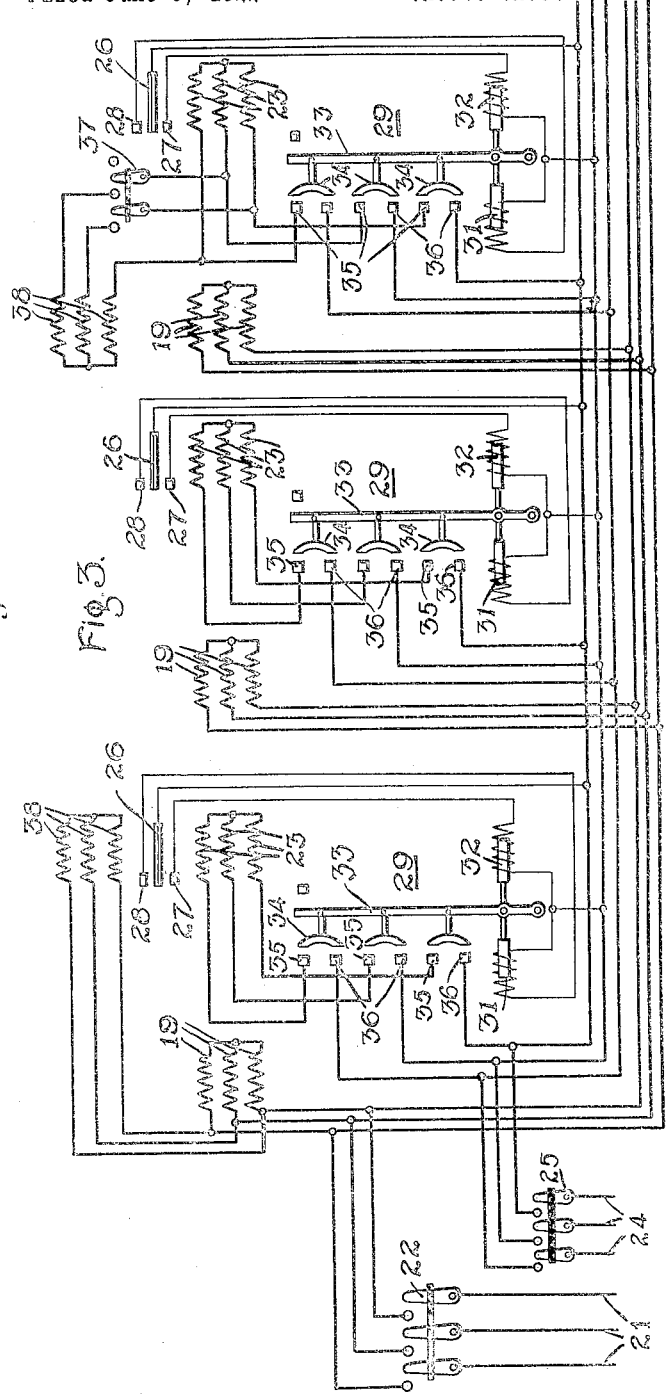
WITNESSES:
INVENTOR
James C. Woodson
BY
ATTORNEY Dec. 16, 1924.  
J. C. WOODSON  
1,519,287  
ELECTRIC HEATING SYSTEM FOR CONVEYER OVENS  
Filed June 5, 1922  2 Sheets-Sheet 2
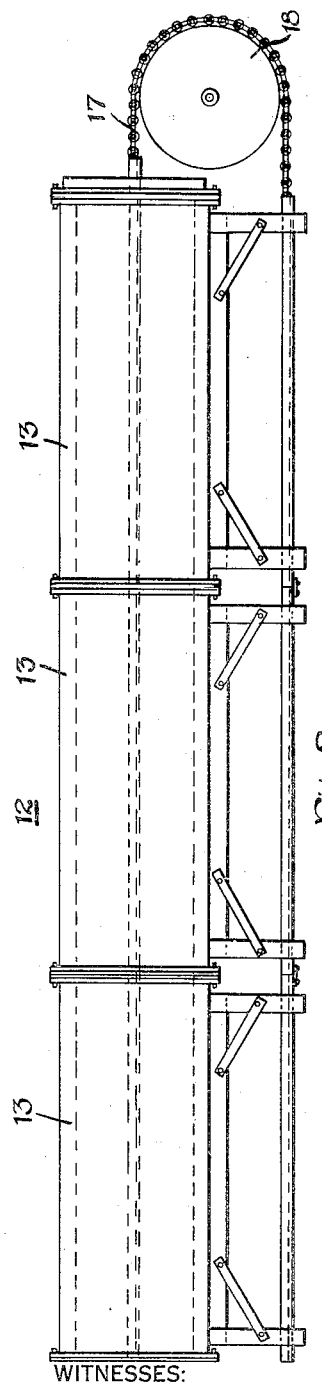
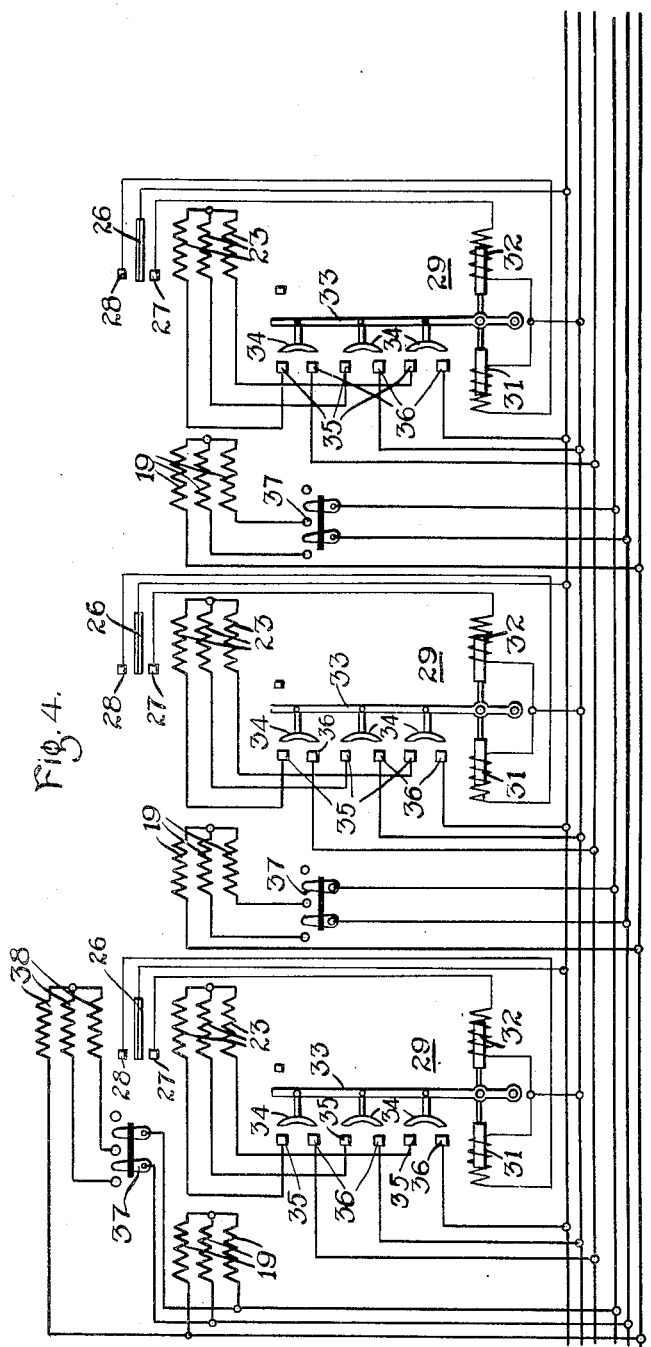
WITNESSES:  
A. L. Jeffrey  
N. M. Biebel
INVENTOR  
James C. Woodson  
BY  
Wesley G. Carr  
ATTORNEY Patented Dec. 16, 1924.

1,519,287

UNITED STATES PATENT OFFICE.

JAMES C. WOODSON, OF MANSFIELD, OHIO, ASSIGNOR TO WESTINGHOUSE ELECTRIC PRODUCTS COMPANY, A CORPORATION OF MICHIGAN.

ELECTRIC HEATING SYSTEM FOR CONVEYER OVENS.

Application filed June 5, 1922. Serial No. 566,170.

*To all whom it may concern:*

Be it known that I, JAMES C. WOODSON, a citizen of the United States, and a resident of Mansfield, in the county of Richland and State of Ohio, have invented a new and useful Improvement in Electric Heating Systems for Conveyer Ovens, of which the following is a specification.

My invention relates to ovens and particularly to heating systems for electrically heated baking ovens and it has for its object to provide improved electric heating systems for bake ovens of the conveyer type.

In practising my invention, I provide a plurality of continuous, horizontally extending oven units and a conveyer for moving material through said oven units. I provide a constantly energized heating element at the entering end of each of the oven units and an automatically controlled heating element at the leaving end, these heating elements being located adjacent the bottoms of the oven chambers. Heating elements are located adjacent the tops of the chambers in spaced-apart relation throughout the assembled oven, which elements may be either constantly or selectively energized.

In my copending application, Serial No. 566,169, and filed concurrently herewith, I have disclosed and claimed the structural features of a conveyer type of electrically heated bake oven comprising a plurality of units, and this application covers the heating system which I have provided for generating the heat for baking the material moved through the oven.

In the drawings,

Figure 1 is a view, in side elevation, of the lefthand half of a bake oven with which is associated the system embodying my invention;

Fig. 2 is a view, in side elevation, of the righthand half of the oven;

Fig. 3 is a diagrammatic representation of a portion of an electric heating system embodying my invention;

Fig. 4 is a diagrammatic representation of another portion of an electric heating system embodying my invention, the two parts illustrated in Figs. 3 and 4 being operatively connected together and illustrated in substantially the relative positions which they occupy in the assembled oven.

An electric bake oven, comprising the two halves 11 and 12, is built up of a number of individual oven units 13 located in abutting longitudinal alinement and comprising a plurality of heat-insulating panels mounted on any suitable or desired internal frame, the units being mounted on individual supporting frames 14 and secured together by a plurality of bolts 15 extending through cooperating flanged members 16 which are secured to the outside of each of the oven units adjacent the two ends thereof. The mechanical construction of the individual oven units will not be further described in this application as it is described and claimed in the hereinbefore mentioned copending application.

An endless conveyer belt 17 is provided, travelling over two relatively large pulleys 18 operatively associated with the assembled oven and located one at each end thereof, the conveyer belt being caused to move through the assembled oven and over the pulleys by any suitable driving mechanism.

Each of the oven units 13 is provided with a plurality of heating elements which are located adjacent the bottom of the oven chamber, substantially as described in the copending application. The heating elements comprise a plurality of resistors 19 which are located at the entering end of each of the oven chambers, that is, that end at which the material to be baked enters the chamber. Any number of resistors may be employed, but three are illustrated, to permit of their being energized from a three-phase source of supply, represented generally by the supply circuit conductors 21, any suitable or desired switch 22 being provided to permit of simultaneously controlling all of the resistors 19. I provide a plurality of resistor members 23 at the leaving end of each of the individual oven units 13, here illustrated as three in number, to permit of connecting them to a three-phase source of supply, indicated generally by the electric circuit conductors 24, a suitable switch 25 being provided to permit of simultaneously energizing or de-energizing all of the resistor members 23 in the entire oven.

Whereas it is intended that the resistors 19 shall be constantly energized, it is intended that the resistors 23 shall be selectively energized, the energization being automatically and thermally controlled by mechanism located in the respective oven chambers, preferably under the thermal control of the resistors 23. A thermally actuated controlling means is here illustrated as comprising a bimetallic strip 26 arranged to operatively engage either one or the other of two contact terminal members 27 or 28 to thereby control an electromagnetic circuit interrupter mechanism 29, here illustrated as comprising two selectively energized coils 31 and 32, which control the position of a lever 33 with which lever are operatively associated a plurality of contact bridging members 34. The contact bridging members operatively engage stationaray contact terminals 35 and 36 to thereby close circuits through the resistors 23 under predetermined temperature conditions within the oven chamber. While I have illustrated a specific construction of electro-magnetic switch, I desire it to be understood that this construction is representative only and any construction which will operate to obtain the desired result is contemplated and may be employed. While I have illustrated a bimetallic strip and hereinafter described the operation of the system as including such a strip, any thermally actuated controlling means known to the art may be employed.

In the construction illustrated, the contact terminal 28 is the one which is operatively engaged by the free end of the bimetallic strip 26 when the temperature is below a predetermined value. When this occurs, a circuit is established through the winding 31 of the electromagnet switch 29, causing the lever 33 to be given a turning movement on its pivot in a counter-clockwise direction, whereby the contact bridging members 34 operatively engage the respective contact terminals 35 and 36, thereby permitting the energization of the resistor members 23. When the temperature in the oven chamber approaches or exceeds that for which the thermal control device is adjusted, it being understood that the contact terminals 27 and 28 are provided with adjusting means, the bimetallic strip engages the contact terminal 27, closing a control circuit through the winding 32 whereby the lever 33 is given a turning movement on its pivot in a clockwise direction and the contact bridging members 34 are caused to be disengaged from their co-operating stationary contact terminals, whereby the energizing circuit through the resistors 23 is interrupted.

As the left-hand end of the assembled bake oven is the receiving end, that is, the raw material enters at that end, it is desirable and necessary to provide somewhat greater heat input at that end of the oven than may be necessary at the other end, which is reached by the material being baked, after its temperature has been raised a substantial amount. In order to permit of manually controlling the resistor members 19 located in those oven units at the leaving end of the assembled oven, I may provide suitable switching means comprising a manually operable switch 37 to permit of varying the energization of the resistors 19. When the switch operatively associated with the resistors 19 in the last two oven units at the leaving end of the oven are moved to their left-hand position, which is not illustrated in the drawing, all of the resistors 19 are fully energized. When the switch is moved to its right-hand position, the energy input into the group of resistors 19 is materially reduced, being substantially one-half of its former value. I am, therefore, able to manually control the energy input, and therefore the temperature, at the entering end of each of the oven units located near the leaving end of the assembled oven. The switches 37 may be located in any suitable or desired position, either on the oven units or on a special switchboard, as may appear desirable.

In order to provide heating elements located above the material being moved through the assembled oven, I provide a relatively smaller number of resistors which are located adjacent the tops of certain of the oven chambers. I provide a plurality of resistor members 38 which are electrically connected in parallel-circuit relation to the resistors 19 located in the same oven chamber and locate these upper heating elements in the leaving end of the first oven unit in order that sufficient heat energy may be provided to quickly raise the temperature of the raw material as it moves through the first of the oven units. I provide a manually and automatically controlled set of resistors 38, located at the entering end of the third of the oven units, a manually controlled switch being provided to control the energization of the resistors 38 substantially as hereinbefore described in connection with certain of the resistors 19 located near the leaving end of the assembled oven. The second set of resistors 38 is not only manually controlled by a switch 37, but is connected in parallel-circuit relation to the resistors 23 in the same oven chamber, which resistors, as hereinbefore described, are thermally controlled, whereby I obtain not only a manual control of the parallel connected resistors 38 but also an automatic control thereof. A third set of resistors 38 may be mounted in the fourth oven unit adjacent the leaving end, at the top thereof, and may be connected in parallel-circuit relation to the resistors 19, a manually operable switch 37 being provided to permit of varying the energization of this set of resistors.

The system embodying my invention thus provides a relatively large heat input at the entering end of a built-up bake oven of the conveyer type, permitting of a quick increase of the temperature of the material which is moved therethrough. The heating elements are divided into two sets, the first set being located at the entering end of each of the oven units and connected to what may be termed a constant source of energy whereby I obtain a zone of substantially constant temperature in the entering end of each of the oven chambers. A set of resistors is provided in each of the individual oven chambers located adjacent the leaving end thereof, which resistors are thermally controlled to provide what may be termed a zone of varying temperature at or adjacent to the leaving end of each of the oven chambers. Material which is to be baked is, therefore, moved through recurrent zones of substantially constant temperature alternating with zones of varying temperature, permitting of obtaining substantially the best possible baking conditions during the time in which the material is being moved through the assembled oven, resulting in a product which is thoroughly and uniformly baked.

Various modifications may be made in the device embodying my invention without departing from the spirit and scope thereof and I desire that only such limitations shall be placed thereon as are imposed by the prior art or are specifically set forth in the appended claims.

I claim as my invention:

1. In an electric heating system for a conveyer type of baking oven, the combination with a plurality of oven units located in abutting relation and means for moving material through all of said ovens, of a continuously energized heating element in each oven unit located adjacent the entering end thereof, a selectively energized heating element in each oven unit located adjacent the leaving end thereof, and temperature actuated means in each oven unit for controlling said selectively energized heating elements.

2. In an electric heating system for a conveyer type of baking oven, the combination with a plurality of oven units located in abutting relation and means for moving material through all of said ovens, of a plurality of spaced-apart heating elements in each of said oven units, said heating elements being so energized as to subject material moved through said oven units, to a zone of substantially uniform heat and then to a zone of variable heat in each oven unit.

3. In an electric heating system for a conveyer type of baking oven, the combination with a plurality of oven units located in abutting relation and means for moving material through all of said ovens, of a plurality of spaced-apart heating elements in each of said oven units, said heating elements being so energized as to subject material conveyed through said baking oven to alternating zones of uniform and of varying heat.

4. In an electric heating system for a conveyer type of baking oven, the combination with a plurality of oven units located in longitudinally-alined relation, and means for moving material through said ovens, of a plurality of spaced sets of heating elements in each of said oven units, and thermally-actuated means for controlling the energization of said heating elements to provide alternating zones of uniform and of varying heat.

5. In an electric heating system for a conveyer type of baking oven, the combination with a plurality of oven units located in longitudinally-alined relation, and means for moving material through said ovens, of a plurality of spaced sets of heating elements in each of said oven units, and thermally-actuated means located in the respective oven units for controlling the energization of certain of said heating elements to provide a zone of substantially uniform heat and a zone of variable heat in each oven unit.

In testimony whereof, I have hereunto subscribed my name this 29th day of May 1922.

JAMES C. WOODSON.